June 9, 1953  W. A. FLUMERFELT  2,641,492
SEALED UNIVERSAL BALL BEARING JOINT
Filed Jan. 12, 1949
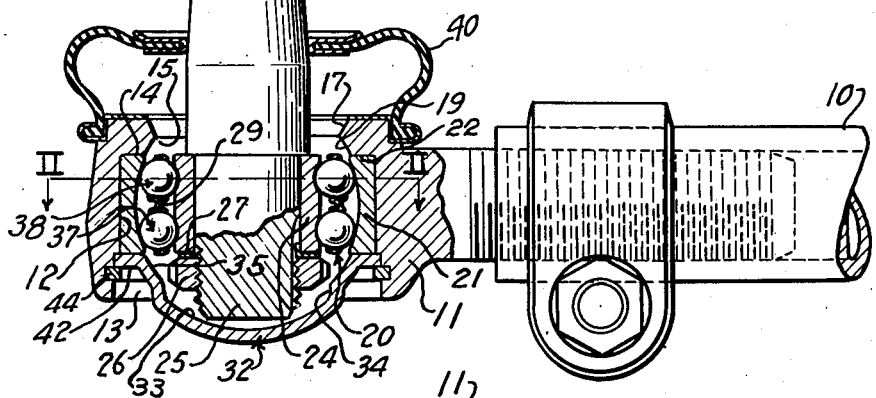
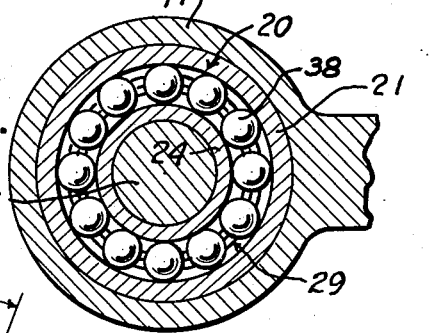
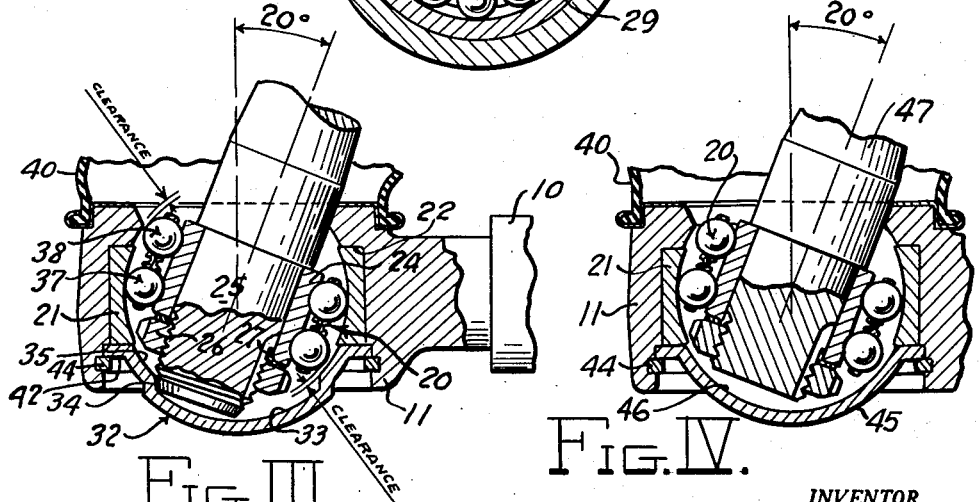
INVENTOR.
William A. Flumerfelt
BY
Edmund B. Whitcomb
ATTORNEY Patented June 9, 1953

2,641,492

UNITED STATES PATENT OFFICE 2,641,492

SEALED UNIVERSAL BALL BEARING JOINT

William A. Flumerfelt, Columbus, Ohio, assignor to The Columbus Auto Parts Company, Columbus, Ohio, a corporation of Ohio Application January 12, 1949, Serial No. 70,513

9 Claims. (Cl. 287—90)

This invention relates to a unitary self-contained sealed universal joint for a tie rod end.

An object of the invention is to provide an improved assembly forming a universal joint in which the life of the joint is extremely long, the entire unit being sealed and in which a wide angle of oscillation of the stud relative to the tie rod is provided, and in which means are incorporated in the construction for limiting the angle of oscillation of the stud. A further and particular object of the invention is to provide a simplified assembly in which an inner and outer oscillating ball bearing race or self-aligning type of ball bearing unit may be inserted as a unit in combination with the housing and sealing means arranging to retain the balls in operation. By my invention, the stud of the unit need not be made too hard for a safe ball stud, since the rotary and oscillatory ball bearing unit with inner and outer races provides for this feature. If the stud were made merely sufficiently hard for a satisfactory stud, the use of the balls in a ball bearing might tend to score the shaft and form premature failure of the universal joint.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a vertical sectional view partly in elevation of my improved universal joint assembly;

Figure II is a cross-sectional view taken on the line II—II of Figure I;

Figure III is a vertical sectional view showing the extreme angularity of movement of the stud; and Figure IV shows a modification of the universal joint shown in Figure III.

Referring to Figure I, it will be seen that the tie rod end 10 has secured thereto the housing 11. This housing 11 has a cylindrical bore 12 therein, extending from one or the open end 13 of the housing 11 to an under surface or ledge 14 spaced from the other end of the housing. By limiting or stopping the bore as shown, I form an inwardly extending flange 15 at the upper end of the housing, as shown in Figure I. However, the inner edge of the flange 15 or inner face thereof is very specially formed, is flared outwardly on a plane surface as indicated at 17, and a lower inwardly flared and also curved face 19 terminates at the ledge 14 or under surface of the flange 15. These surfaces 17 and 19 are for purposes hereinafter set forth.

A unitary rotary and oscillatory self-contained ball bearing unit 20 is inserted within the housing through the cylindrical bore 12 therein. The ball bearing 20 has an outer curved or spherically shaped ball race 21, the upper edge of face 22 of which contacts the under side of ledge 14 of the flange 15. The inner ball race 24 is cylindrical or ring shaped with two transverse ball bearing grooves therein and is secured to the stud 25 by a suitable locking nut 26 and washer 27. The ball bearing unit has two rows of balls 37 and 38 and a suitable inter-row retaining cage 29, as shown.

A specially constructed retaining cover 32 at the lower end of the housing closes this end of the joint and also holds the outer ball race 21 in place. The cover 32 is provided in which a curved portion 33 forms a space for the lower end of the stud 25 to swing in an arc therein. The cover 32 also has (as shown in Figures I and III) an offset portion 34 which is arranged to form a stop against which the lower end of the stud 25 contacts as a means for limiting the oscillation of the stud relative to the housing.

It will be noted that the ball bearing unit 20 by having the spherically shaped outer ball race or curved surface race 21 and arranging for movement of the two races, one with respect to the other, provides for oscillation of the axis of the stud relative to the housing 11 since the inner race is secured to the stud and moves with it as illustrated in its extreme angle of oscillation, as shown in Figures III and IV.

A feature of my invention consists in constructing the curved spherically shaped portion 19 of the flange 15 to form in effect an offset continuing surface corresponding in curvature to the curved surface of the outer ball bearing race 21. At the other end of the joint the cover 32 is also provided with a similarly curved portion 35 which corresponds to the curvature of the outer ball race but also offset therefrom to provide a clearance as shown. Thus, it will be seen that the upper curved surface or flared inner portion of the flange 15 forms a means for retaining in place the upper row of balls 38 as shown in the upper left-hand part of Figure III. Likewise, the lower curved section 35 of the cover 32 retains the balls as indicated in the lower right-hand portion of Figure III. Since neither the housing 11 nor the cover member 32 need be hardened, these surfaces 19 and 35 provide means for retaining the balls in proper position, but since these surfaces are properly spaced from an otherwise continuation from the curved outer ball race 21, there will be no wear or pressure on the balls in the extreme limits of oscillation just referred to. The center of the spherically curved ball race 21 coincides with the center of oscillation of the stud axis as indicated. By providing the two rows of balls 37 and 38, it will be seen from Figure III that, regardless of the limit of oscillation of the stud 25, at least a substantially semi-circular number or more of balls 37 in one row and a substantially semicircular number or more of balls 38 in the other row will be in contact with the outer hardened ball race 21 as shown, regardless of the position of some of the balls both at the upper left-hand portion and the lower right-hand portion, shown in Figure III, upon the limit of oscillation of the shaft.

I have also provided a cooperation between the location and angle of flare of the surface 17 with which the shank of the stud 25 contacts in the limit of its swing, as indicated in Figure III, and the surface 34 offset from the cover 32 at the other end of the joint to properly limit both above and below the center of oscillation the swing of the stud relative to the housing and assembled joint.

To properly seal the entire joint, I provide a flexible rawhide dust cover or boot 40 extending from the shaft 25 to the outer portion of the flange 15 on the housing 11. It will be also noted that the closure 32 for the other end of the joint is provided with a flange 42 and may be retained in the housing 11 by spring lock washer 44, as shown.

In the modification shown in Figure IV, I provide a cover 45 with a continuous interior spherical surface 46 forming a spaced extension of the spherically curved ball race 21. The stud 47 is the same as stud member 25 except that the bottom portion is cut off below this retaining nut 26 and thus the oscillation of the stud is limited only by its contact with the housing surface 17.

It is apparent that, within the scope of the invention, modifications and different arrangements may be made other than is herein disclosed, and the present disclosure is illustrative merely, the invention comprehending all variations thereof.

What I claim is:

1. In a sealed universal joint, a housing having a cylindrical bore through one end; a ledge in the inner wall of said housing; an inwardly extending flange adjacent one end of said bore in said housing, the inside edge of said flange having oppositely flared outer and inner edges; a self aligning two-ball ball race bearing unit in said bore of the housing; a shaft inside said bearing unit, said unit having inner and outer ball races, means to secure the inner race of said bearing unit on said shaft; means to secure said outer race in said housing with one end thereof contacting said ledge; an arcuate shaped retaining member closing the open end of said bore in said housing; said member having an surface extension corresponding to the curved surface of said outer ball bearing race; stop means to limit the angle of oscillation of said shaft; and a flexible seal between said shaft and said flanged end of said housing.

2. In a sealed universal joint, a housing having a cylindrical bore through one end; a ledge in the inner wall of said housing; an inwardly extending flange on said housing, said flange having oppositely flared outer and inner edges; a self-aligning two ball race unitary ball bearing unit having inner and outer ball races in said cylindrical portion of the housing; a shaft inside said bearing unit, means to lock the inner race of said bearing unit on said shaft; an arcuate shaped retaining cover closing said cylindrical bore in said housing; said cover having a surface corresponding to and of greater diameter than the curved surface of said outer ball bearing race and forming an offset extension thereof; and a shoulder on said cover contacted by the end of said shaft to limit the angular movement of said shaft.

3. In a sealed universal joint, a housing having a cylindrical bore through one end; an inwardly extending flange on said housing, said flange having oppositely flared outer and inner edges; a self-aligning two ball race unitary ball bearing unit having inner and outer ball races in said cylindrical portion of the housing; a shaft inside said bearing unit, means to lock the inner race of said bearing unit on said shaft; an arcuate shaped retaining cover closing said cylindrical bore in said housing; said cover having a surface extension corresponding to the curved surface of said outer ball bearing race and forming an offset extension thereof; the side of the shaft adapted to contact the outer flare of said housing flange to limit the angular movement of said shaft.

4. In a sealed universal joint, a housing having a cylindrical bore therethrough from one end to adjacent the other end; a ledge therein; an inwardly extending flange at said other end with oppositely flared outer and inner edges; a self-aligning unitary double ball bearing unit having inner and outer ball races in said cylindrical portion of the housing; a shaft inside said bearing unit, means to lock the inner race of said bearing unit on said shaft with one end of the outer race of said bearing unit contacting said ledge; an arcuate shaped retaining member closing the open end of said cylindrical bore in said housing; said member having a surface extension corresponding to the curved surface of said outer ball bearing race and forming an offset extension thereof; and a shoulder on said retaining member contacted by the end of said shaft to limit the angular movement of said shaft.

5. In a sealed universal joint, a housing having a cylindrical bore therethrough from one end to adjacent the other end; a ledge therein; an inwardly extending flange at said other end with oppositely flared outer and inner edges; a self-aligning unitary double ball bearing unit having inner and outer ball races in said cylindrical portion of the housing; a shaft inside said bearing unit, means to lock the inner race of said bearing unit on said shaft with an end of the outer race of said bearing unit in contact with said ledge; an arcuate shaped retaining member closing the open end of said cylindrical bore in said housing; said member having a surface extension corresponding to the curved surface of said outer ball bearing race and forming an offset extension thereof; the side of the shaft contacting the outer flare of said housing flange to limit the angular movement of said shaft.

6. In a sealed universal joint, a housing, a cylindrical cavity extending from one end to adjacent the other end; said housing having an opening in the other end with an inwardly extending flange, the inner edge of said flange having two oppositely inclined surfaces, one extending outwardly and the other inwardly; a stud extending through said flanged opening in said housing; a ball bearing unit located between said stud and the inner wall of said housing, said bearing unit having an outer segmental spherically-shaped ball race, one end surface thereof contacting said flange; a cover for the other end of said cavity; means to secure said cover in place and retain said outer ball race in place; means to secure the inner ball race to said stud; the inner flared surface of said housing flange and the inner surface of said cover forming offset spherically-shaped surfaces substantially corresponding to the curvature of said outer ball race; and means to limit the angular movement of said stud relative to said housing.

7. In a universal joint, a housing, a cylindrical cavity extending from one end to adjacent the other end; said housing having an opening in the other end smaller than said cavity and an inwardly extending flange, the inner wall of said flange having two oppositely inclined surfaces, one extending outwardly and the other inwardly; a stud extending through said opening in said housing; a unitary ball bearing unit between said stud and said housing, said bearing unit having an inner ball race fixed to said stud and having a ball groove corresponding to the diameter of the balls; an outer ball race secured in said housing and having a spherically curved surface of a radius whose center is in the axis of the stud located substantially at the center of oscillation of said stud; a cover for the other end of said cavity; means to secure said cover in place and retain said outer ball race in place; means to secure the inner ball race to said stud, the inner inclined surface of said housing flange and the inner surface of said cover forming an offset spherically shaped surface corresponding to the curvature of said outer ball race; and means to limit the angular movement of said stud relative to said housing.

8. In a universal joint, a housing having a cavity therein; a rotary and oscillatory stud capable of oscillation through a relatively wide angle; a unitary two race ball bearing positioned in said cavity in said housing and interposed between said stud and the cavity wall; said bearing having a one-piece hardened inner ball race fixed to said stud, said inner ball race having a pair of circumferentially arranged grooves centered on the axis of said stud with the transverse configuration of the grooves corresponding to the radius of the balls; the outer ball race of said bearing comprising a one-piece hardened member secured in said housing and having a spherically curved inner ball contacting surface whose radius is at the center of said stud, said outer race adapted to receive both series of balls of said two race ball bearing; and means located at opposite ends of said cavity in said housing to provide a spherical surface extension of said outer race and of a larger radius than said outer race adapted to be contacted by a plurality of balls of one of said series of balls without receiving bearing thrust at certain angles of oscillation of said stud relative to said housing and to return said balls to contact said outer race after angle of oscillation is returned to normal.

9. In a universal joint, a housing having a cavity therein; a rotary and oscillatory stud capable of oscillation through a relatively wide angle; a unitary two race ball bearing positioned in said cavity in said housing and interposed between said stud and the cavity wall; said bearing having a one-piece hardened inner ball race fixed to said stud, said inner ball race having a pair of circumferentially arranged grooves centered on the axis of said stud with the transverse configuration of the grooves corresponding to the radius of the balls; the outer ball race of said bearing comprising a one-piece hardened member secured in said housing and having a spherically curved inner ball contacting surface whose radius is at the center of said stud, said outer race adapted to receive both series of balls of said two race ball bearing; and means located at opposite ends of said cavity in said housing to provide extensions of said outer race larger than said outer race and adapted to be contacted by a plurality of balls of one of said series of balls without receiving bearing thrust at certain angles of oscillation of said stud relative to said housing; said extensions being small enough to prevent said balls from leaving the inner race grooves of said bearing.

WILLIAM A. FLUMERFELT.

References Cited in the file of this patent

UNITED STATES PATENTS

| Number | Name | Date |
|---|---|---|
| 1,250,620 | Moysey | Dec. 18, 1917 |
| 1,898,334 | Baker | Feb. 21, 1933 |
| 2,197,037 | Gardner | Apr. 16, 1940 |
| 2,206,972 | Niles | July 9, 1940 |
| 2,211,817 | Hufferd et al. | Aug. 20, 1940 |
| 2,397,464 | Booth | Apr. 2, 1946 |